United States Patent Office 3,264,181
Patented August 2, 1966

3,264,181
BIRD MANAGEMENT PRODUCTS, PREPARATION, AND USE
Lyle D. Goodhue, Bartlesville, Okla., assignor to Phillips Petroleum Company, a corporation of Delaware
No Drawing. Filed June 17, 1963, Ser. No. 288,476
7 Claims. (Cl. 167—46)

This invention relates to the control of birds. In one aspect the invention relates to novel bird management products. In another aspect the invention relates to a process for preparing bird management products. In another aspect the invention relates to a method for clearing an area of birds.

The control of birds is a major problem which faces both rural and urban areas. For example, farmers lose large amounts of grain by bird consumption, and large amounts of money are spent in cities attempting to avoid the nuisance created by birds. Flocks of birds in the runway area endanger airplanes which are landing or departing.

Recently, a new method for controlling birds by preventing large flocks from frequenting specific locations has been developed. U.S. Patent 3,044,930 of L. D. Goodhue and K. E. Cantrel, filed December 8, 1960, and issued July 17, 1962, and the application of L. D. Goodhue, A. J. Reinert and R. P. Williams, Serial No. 152,005, filed November 13, 1961, now U.S. Patent 3,113,072, describe in detail and claim a process by which birds are controlled using bird management chemicals. According to said patent and said application, various heterocyclic nitrogen-containing compounds are incorporated in bird foods and, when a bird eats a small amount of the treated food, the actions of the bird, including warning cries emitted, drive other birds from the area. Some of these heterocyclic nitrogen compounds turn bright yellow upon standing in sunlight for a short period of time, that is they are light sensitive. Many birds, particularly sea gulls, dislike the yellow color of these compounds sufficiently that they refuse to eat the treated food. It is therefore obvious that it is desirable that steps be taken to inhibit or prevent the discoloration due to sunlight in order to more fully obtain the beneficial results from the bird management compositions.

It is therefore an object of this invention to provide a non-yellowing bird management composition. Another object of the invention is to provide novel bird management products. A still further object of the invention is an improved process for preparing bird management products. Yet another object of the invention is to control birds through the use of novel bird management products.

According to the present invention a non-yellowing bird management composition is prepared by impregnating a particle of bird food with a solution of a bird management compound having a structural formula selected from

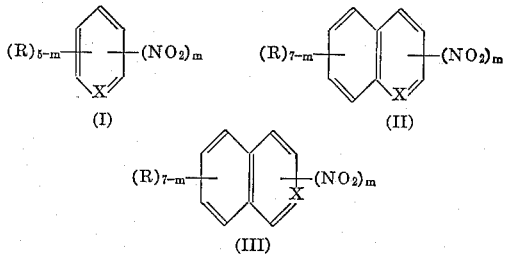

where X is selected from the group consisting of —N= and

$n$ is an integer selected from the group consisting of 0, 1, and 2; R is selected from the group consisting of hydrogen, methyl and ethyl radicals, and $m$ is an integer selected from the group consisting of 1 and 2, and thereafter subjecting the thus impregnated particles to a washing step wherein the bird management compound is removed only from the outer portion of said food particle.

Some examples of compounds of the above general formulas which can be employed as bird management chemicals in the non-yellowing bird management compositions of this invention are:

4-nitro-3-methylpyridine,
3-nitro-2-methylpyridine,
4-nitro-2,5-dimethylpyridine,
4-nitro-2-methyl-5-ethylpyridine,
4-nitro-2,3,6-trimethylpyridine,
3-nitro-2,4,6-trimethylpyridine,
4-nitro-2,3,5,6-tetraethylpyridine,
3,5-dinitropyridine,
3-nitroquinoline,
4-nitro-2,8-dimethylquinoline,
5-nitroisoquinoline,
4-nitro-2,6-diethylquinoline,
4-nitro-3-methylisoquinoline,
4-nitro-2,3,5,6,7,8-hexaethylquinoline,
4-nitro-2-methyl-5-ethylpyridine-N-oxide,
2-methyl-5-ethyl-6-nitropyridine-N-oxide,
5,6,7,8-tetraethyl-2,4-dinitroquinoline-N-oxide dihydrate,
4-nitro-pyridine-N-oxide,
4-nitro-3-methylpyridine-N-oxide,
4-nitro-2-methylpyridine-N-oxide,
2,4-dinitropyridine-N-oxide,
2-nitropyridine-N-oxide,
5-nitroisoquinoline-N-oxide.

Impregnation of the bird food particle with one of the above compounds can be carried out by means of a solvent. Suitable solvents for the bird management compounds which can be employed for impregnation are preferably substantially inert with respect to the active bird management compound which is selected. Some examples of specific solvents which can be used are water and acetone, although hydrocarbons such as kerosene, naphthas, and the like can be employed if desired. One preferred solvent for impregnation is a water-acetone mixture containing from about 30 percent to about 70 percent water. The impregnation solution will generally contain from 0.5 to 50 percent by weight of the bird management compounds.

The washed final product preferably contains from about 0.01 to about 10 weight percent of the bird management compound, and more preferably from about 0.05 to about 5 weight percent of the compound. The washing step of the present invention will generally remove up to around 50 percent by weight of the impregnated compound, thus one will impregnate with a correspondingly higher amount of the active material.

Following the impregnation of the food particle with the desired amount of bird management compound, the food, wet with the impregnating solvent, is then washed to remove bird management compound from the outer layer of the impregnated food. Preferably, a drying step is employed intermediate the impregnation and washing steps. If acetone or water-acetone mixtures are employed as the impregnating solvent, intermediate drying and final drying can be effected at room temperature or temperatures generally not above 100° F. If water alone is employed, or some other material boiling above acetone, it is advantageous to employ higher temperatures. Such temperatures will generally not exceed 220° F.

The washing action to remove the bird management compound from the outer layers of the food particle is conveniently carried out by agitating the impregnated grain in a suitable wash material. Suitable wash materials include water, acetone and water-acetone mixtures. The amount of wash fluid employed will generally range from 0.1 to 2.0 gallons of wash fluid per pound of impregnated bird food being washed. This range is described for use in a single washing step, although it is preferred to carry out the washing procedure as a series of washing steps, generally at least three steps. In each case, the total amount of wash fluid described above will be satisfactory. One method of effecting the washing is to contain the impregnated bird food in a perforated container and immerse the perforated container containing the impregnated bird food in a vessel containing the desired amount of wash fluid. The container is then agitated in a reciprocating motion for a short period of time. The time of washing can vary over a rather wide range, depending upon the amount of bird management compound it is desired to remove from the outer layers of the food particle and further depending upon the particular wash fluid employed. Acetone will penetrate most bird foods such as grains much more readily than water will. Thus, the higher the percentage of acetone in wash fluid, the shorter the time required for removal of the compound from the outer layers. In most cases, the time of washing in each stage will be less than ½ minute, and is generally less than 15 seconds.

By employing a multi-stage washing, one can effect an economy in the bird management compound. As one washes in the first stage, considerably more bird management compound is removed in this first stage than in subsequent stages. An equilibrium is arrived at in which, as the concentration of bird management compound in the wash fluid increases and the concentration in the impregnated bird food decreases, an equilibrium is reached at which very little additional bird management compound is removed during the short period of washing. One can then use the wash fluid containing fairly high concentrations of bird management compound as an impregnation solution for impregnating additional quantities of bird food. It may be necessary to add additional bird management compound to this impregnating solution, but it is obvious that economy is effected. Thus, as the first stage wash fluid is removed and employed as impregnation solution for the treatment of addition bird food, the second stage fluid is then used as first stage wash fluid, and succeeding stages move up one stage. Thus, third stage wash fluid would become second stage wash fluid, and fresh acetone-water mixture or other wash solutions could be charged to the third stage washing vessel or unit. It can be seen that the washing series can be carried out rapidly and efficiently with economy in bird management compound.

After the material has been washed to remove bird management compound from the outer layers of the food particles, the treated food is then subjected to a final drying step to remove residual wash fluid. The thus treated food particles can then be employed as a bird management product. Such a bird management product can be employed to clear birds from an area. In such a method of operation, one or more of the birds in the area to be cleared must digest an effective amount of at least one of the bird management compounds. Bird foods which can be treated in the above described manner include such materials as grains, including sorghum (milo), corn kernels, chopped corn, chicken feed, kaffir, and the like or pieces of such materials as potatoes. The invention is particularly applicable to bird management products in which grain is to be used as the bait, but it is also applicable wherein other bird foods are employed as bait.

As described above, the impregnated and washed food generally contains from 0.01 to about 10 weight percent of the bird management compound, the percentage varying with the activity of the agent employed, the amount impregnated in the grain, the time of washing, and the particular wash solvent used. The amount of effective compound which must be ingested by a bird to obtain the desired effects falls within the range of about 3 to about 500 mg. of the active ingredient per kg. weight of bird, more usually in the range of about 5 to about 100 mg./kg. and generally less than 50 mg./kg. The washing process of this invention is particularly adapted to treatment to the impregnation and washing of grains which have been treated with a nitro-substituted pyridine-N-oxide.

While the invention has been described in terms of impregnating bird food particles with a solution of one of the defined bird management compounds in a solvent, it is within the contemplation of the invention to admix the bird management compound with suitable bait material and to pelletize or otherwise process the admixture to produce solid particles of bait material containing the bird management compound dispersed throughout, it being understood that such solid particles have the qualifications of being substantially unaffected by the washing step other than the removal of the bird management compound from the outer layers of the particle and being able to retain the bird management compound that is in the inner layers of the particle.

The nitro-substituted N-oxides of heterocyclic nitrogen compounds are disclosed in the above-mentioned patent of Goodhue et al., while the nitro-substituted heterocyclic nitrogen compounds which are not N-oxides are disclosed in the above-mentioned application of Goodhue et al., Serial No. 152,005, filed November 13, 1961. Many of these bird management chemicals can be purchased from commercial sources, but not all are so available. Synthesis of these compounds can be accomplished by conventional techniques. For example, an N-oxide can be formed by reacting pyridine with hydrogen peroxide, charged for example, as 30 percent aqueous $H_2O_2$. With acetic acid present in a 4/1 molar ratio of acetic acid to pyridine, the acetic acid serves as an oxygen carrier, forming peracetic acid in situ. Such a reaction can be carried out, for example, at about 85° C. for 10 hours.

By forming the N-oxide first, it is possible then to form a 4-nitropyridine-N-oxide using a conventional nitration procedure, for example, a molar ratio of pyridine-N-oxide/$HNO_3$/$H_2SO_4$ of 1/3.0–3.5/3.5–70. After forming the nitrated N-oxide, if one desires, for example, to convert 4-nitropyridine-N-oxide to a 4-nitropyridine, this can be accomplished by reaction with $PCl_3$. Similar reactions can be employed to form the other compounds which contain, for example, substituent alkyl radicals.

As will be shown in the following specific examples, the impregnated and washed bird management compositions of this invention are much less subject to yellowing in sunlight than similar compositions which have not been subjected to the washing operation. Thus, the bait is more readily accepted by birds, and thus a more efficient bird management operation can be achieved.

The following specific examples are presented in illustration thereof but are not to be construed unduly in limitation thereof.

*Example I*

White kaffir was impregnated with an acetone solution of 4-nitro-pyridine-N-oxide. After drying, the impregnated grain analyzed 0.45 weight percent of the active compound. A sample of this material turned yellow when placed in the sun for approximately 5 minutes. Another sample of the impregnated grain was washed twice with water and once with acetone, using rapid agitation and a short washing time of approximately 10 seconds in each washing step. The washed grain, after drying was exposed to the sun for a period of one day, and no yellow discoloration formed. This composition was employed as a bird management chemical on sparrows, and the sparrows were noted to undergo violent convulsions and to emit warning cries.

Example II

Ten kilograms of clean, dry white kaffir was impregnated with 4-nitro-pyridine-N-oxide in the following manner. Sixty-five grams of 4-nitro-pyridine-N-oxide was dissolved in a 50/50 solution of acetone/water made up by mixing 2070 ml. of each. The grain and the solution were mixed together and tumbled for about 7–8 hours, after which the damp mixture was removed and dried in various manners. 2600 grams of the wet mixture was dried in a small drum drier using an inlet air temperature of 180° C. The impregnated grain temperature rose to about 70° C. during drying. The dry material analyzed 0.54 weight percent 4-nitro-pyridine-N-oxide. The remaining wet impregnated grain was charged to the drum drier and the acetone present was evaporated off. The remaining impregnated grain was taken out of the drum drier and allowed to stand in air at room temperature. After drying, this material analyzed 0.57 weight percent 4-nitro-pyridine-N-oxide. Half of the material dried to completion in the drum drier was washed for 5 minutes in a 50/50 acetone/water mixture, after which the material was sucked dry in a Buchner funnel. The material was again washed for 1 to 2 minutes and again sucked dry. This material was then dried in a drum drier, and found to analyze 0.37 weight percent active compound. The washing itself was accomplished by placing the grain in a screen wire basket moving up and down in the washing mixture in a plastic container. A sample of the wet impregnated grain was washed without drying in the same manner used for the dried grain. This material analyzed 0.308 percent 4-nitro-pyridine-N-oxide.

Example III

Fifteen kilograms of wheat was impregnated with 4-nitro-pyridine-N-oxide by mixing the wheat with a solution comprising a 2250 ml. water, 2250 ml. acetone, 150 grams of 4-nitro-pyridine-N-oxide and a small amount of 4-nitro-pyridine-N-oxide which was present in the water-acetone mixture from a previous wash. The wet mixture was dried two days under a hood in a laboratory, after which it was basket washed by dipping a perforated basket containing the impregnated grain in three different 50/50 water/acetone solutions each comprising about 1 gallon. After 5 dips in each wash solution, the material was drained thoroughly and dried. The amount of 4-nitro-pyridine-N-oxide used to impregnate the grain was sufficient to provide about 1 weight percent of compound on the grain. After washing, the grain analyzed 0.49 weight percent active compound.

When the grain which had been impregnated, washed and dried was exposed to an ultraviolet sun lamp, no detectable coloration occurred in 4 hours. On unwashed grain, yellow coloration occurs within 5 minutes.

Reasonable variation and modification are possible within the scope of the foregoing disclosure and appended claims.

I claim:

1. A process for the preparation of a bird management product, comprising the steps of impregnating a particle of bird food with a heterocyclic nitrogen containing compound having a structural formula selected from the group consisting of:

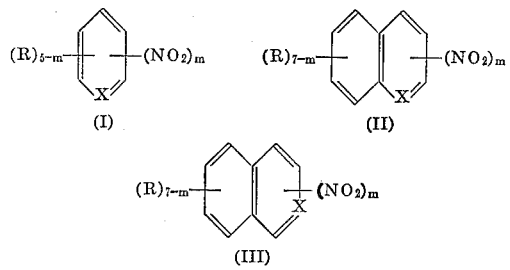

where X is selected from the group consisting of —N= and

$n$ is 0, 1 or 2; R is selected from the group consisting of hydrogen, methyl and ethyl, and $m$ is 1 or 2, said compound being dissolved in a solvent for said compound which penetrates readily into said particle thereby dispersing said compound throughout said particle; and drying the thus impregnated particle; and thereafter washing the impregnated particle to remove said heterocyclic nitrogen containing compound substantially only from the outer portion of said particle to prevent a change in color in the outer portion of said particle which would otherwise result upon exposure to sunlight from the presence of said heterocyclic nitrogen containing compound in said outer portion.

2. A process in accordance with claim 1 wherein said heterocyclic nitrogen containing compound is 4-nitro-pyridine-N-oxide and said solvent comprises acetone.

3. A process in accordance with claim 1 wherein said step of washing comprises washing said impregnated particle in a plurality of stages in sequence with the same solvent as used in the impregnation step, and further comprising withdrawing the solvent from the first of said plurality of stages when the concentration of said heterocyclic nitrogen containing compound therein exceeds a predetermined value, adding an additional amount of said heterocyclic nitrogen containing compound to the solvent thus withdrawn, utilizing in said step of impregnating a particle of bird food the thus withdrawn solvent to which said additional amount has been added, transferring the solvent from each of said plurality of stages to the immediately preceding stage, and adding fresh solvent to the last of said plurality of stages.

4. A bird management product comprising a particle of bird food having dispersed throughout the inner portion of said particle a quantity of a heterocyclic nitrogen containing compound having a structural formula selected from the group consisting of:

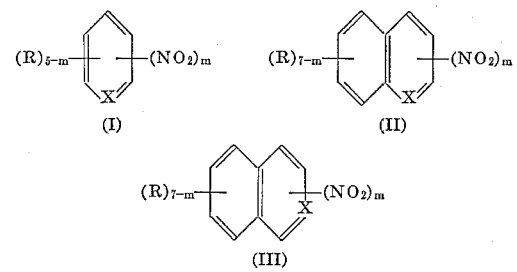

wherein X is selected from the group consisting of —N= and

$n$ is 0, 1, or 2; R is selected from the group consisting of hydrogen, methyl and ethyl, and $m$ is 1 or 2, the outer portion of said particle being substantially free of said heterocyclic nitrogen containing compound to prevent a change in color in the outer portion of said particle which would otherwise result upon exposure to sunlight from the presence of said heterocyclic nitrogen containing compound in said outer portion.

5. A bird management product in accordance with claim 4 wherein said heterocyclic nitrogen containing compound is 4-nitro-pyridine-N-oxide.

6. A method of clearing an area of birds which comprises placing a particle of bird food within an area from which birds are to be cleared, said particle of bird food having dispersed throughout the inner portion of said particle a quantity of a heterocyclic nitrogen containing compound having a structural formula selected from the group consisting of:

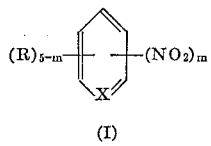 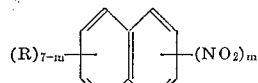

(I)  (II)

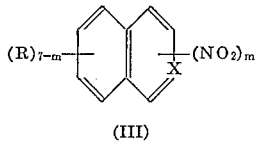

(III)

wherein X is selected from the group consisting of —N= and

$n$ is 0, 1 or 2; R is selected from the group consisting of hydrogen, methyl and ethyl, and $m$ is 1 or 2, the outer portion of said particle being substantially free of said heterocyclic nitrogen containing compound to prevent a change in color in the outer portion of said particle which would otherwise result upon exposure to sunlight from the presence of said heterocyclic nitrogen containing compound in said outer portion.

7. A process for the preparation of a bird management product, comprising the steps of impregnating a particle of bird food with a heterocyclic nitrogen containing compound having a structural formula selected from the group consisting of:

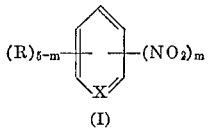 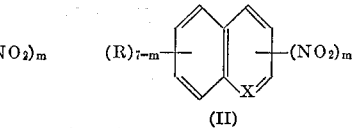

(I)  (II)

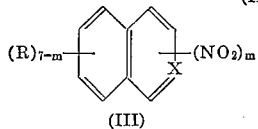

(III)

wherein X is selected from the group consisting of —N= and

$n$ is 0, 1 or 2; R is selected from the group consisting of hydrogen, methyl and ethyl, and $m$ is 1 or 2, said compound being dissolved in a solvent for said compound which penetrates readily into said particle thereby dispersing said compound throughout said particle; and thereafter washing the impregnated particle to remove said heterocyclic nitrogen containing compound substantially only from the outer portion of said particle to prevent a change in color in the outer portion of said particle which would otherwise result upon exposure to sunlight from the presence of said heterocyclic nitrogen containing compound in said outer portion.

References Cited by the Examiner
UNITED STATES PATENTS

| | | | |
|---|---|---|---|
| 3,044,930 | 7/1962 | Goodhue et al. | 167—48 |
| 3,113,072 | 12/1963 | Goodhue et al. | 167—46 |
| 3,150,041 | 9/1964 | Goodhue et al. | 167—48 |

JULIAN S. LEVITT, *Primary Examiner.*

S. J. FRIEDMAN, *Assistant Examiner.*